United States Patent [19]

Plaster

[11] 4,232,794
[45] Nov. 11, 1980

[54] AUTOMATIC CAR COUPLER

[76] Inventor: Ronnie C. Plaster, Rte. 1, Box 23, Tazewell, Va. 24651

[21] Appl. No.: 948,374

[22] Filed: Oct. 4, 1978

[51] Int. Cl.³ ............................................. B61G 1/06
[52] U.S. Cl. ..................................... 213/179; 213/176
[58] Field of Search ................. 213/86, 109, 110, 124, 213/129, 141, 142, 144, 162, 164, 172–176, 179

[56] References Cited

U.S. PATENT DOCUMENTS

| | | | |
|---|---|---|---|
| 323,154 | 7/1885 | Jackson | 213/179 |
| 348,363 | 8/1886 | Webb et al. | 213/179 |
| 2,228,357 | 1/1941 | Larsson | 213/176 |
| 2,631,862 | 3/1953 | Johnson | 213/179 |

FOREIGN PATENT DOCUMENTS 43487  3/1910  Austria ..................................... 213/179

*Primary Examiner*—John J. Love
*Attorney, Agent, or Firm*—Griffin, Branigan & Butler

[57] ABSTRACT

A car coupler includes first and second complementary coupling members which are respectively attached to cars by means of drop pins about which the coupling members can rotate horizontally. The first coupling member (female) includes an elongated coupling bar which is supported by a frame allowing 360° of access thereabout. The second coupling member (male) comprises a frame having a latching lever and a locking lever with axes approximately parallel to the coupling bar. The latching lever forms a latching hook having a nose portion which pivots behind the coupling bar when the latching lever is pivoted to a coupling position. The nose portion defines a notch which is engaged by a locking hook of the locking lever on the other side of the bar for locking the latching lever behind the bar.

18 Claims, 8 Drawing Figures

AUTOMATIC CAR COUPLER

BACKGROUND OF THE INVENTION

This invention relates broadly to couplers for railroad cars, and more particularly to couplers for mining-type railroad cars.

Although automatic couplers for mining cars have been available for many years, many mines do not use them, but rather prefer to use simple coupling bars which extend between cars and which have holes at each end for receiving coupling pins. Although such simple couplers provide satisfactory coupling once they are hooked up, hooking them between cars is unduly hazardous. In this respect, an operator must position himself between two heavy cars when lining up the holes for insertion of the pins. Injuries take place to operators because of unexpected movements of the two heavy cars catching fingers and other body parts, between operating elements. Thus, it is an object of this invention, to provide a practical coupler for mining cars which automatically couples cars together without an operator being positioned between two cars, or being close to coupler elements.

It is necessary for coupler elements, or members, of mining cars to be interchangeble between car ends because there is often no way to turn cars around. That is, either end of any car must be compatible to interlock with either end of other cars. Therefore, it is an object of this invention to provide a coupler which has coupler members which can be moved between opposite ends of a car.

An important feature of mining car couplers is that they allow very little longitudinal slack or "slop." Thus, it is an object of this invention to provide a coupler which has very little longitudinal slack therein.

An effective coupler for use in mining cars should have the following characteristics:
 (1) It should be uncomplicated to operate and in structure;
 (2) It should have no electrical components;
 (3) It should allow very little longitudinal slack;
 (4) It should have coupler elements which substantially self-align so that the presence of an operator between cars is not required;
 (5) It must be extremely reliable so as to avoid accidental tripping or ineffective coupling which might cause accidents;
 (6) It must be sufficiently light that it can be handled by one man;
 (7) It must provide a great deal of vertical pivotal movement between cars because of frequent changes in grade in mines.

It is an object of this invention to provide a coupler for mining cars which has these characteristics.

SUMMARY OF THE INVENTION

According to principles of this invention, first (female) and second (male) coupling members are mounted to rail cars by means of drop pins.

The first coupling member comprises an elongated bar to which 360° of access thereabout is available. The second coupling member comprises a frame member having a latching lever and a locking lever pivotally mounted thereon at latching-lever and locking-lever pivot mounts. The latching-lever pivot mount has an axis which is approximately parallel to the bar when the first and second coupling members are interlocked with each other. The latching lever forms a hook having a nose portion which passes behind the bar when the latching lever is pivoted to an interlocking position and the nose portion defines a notch which is engaged by a hook of the locking lever on the other side of the bar for holding the latching lever on the other side of the bar. Thus, the latching lever is held in this interlocking position by the locking lever. A safety locking pin can be put in place for holding the locking lever in the locking position. The latching lever is automatically moved to a latching position by the coupling bar impinging on an arm of the latching lever. A release handle is linked to the locking lever for releasing the coupling bar.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
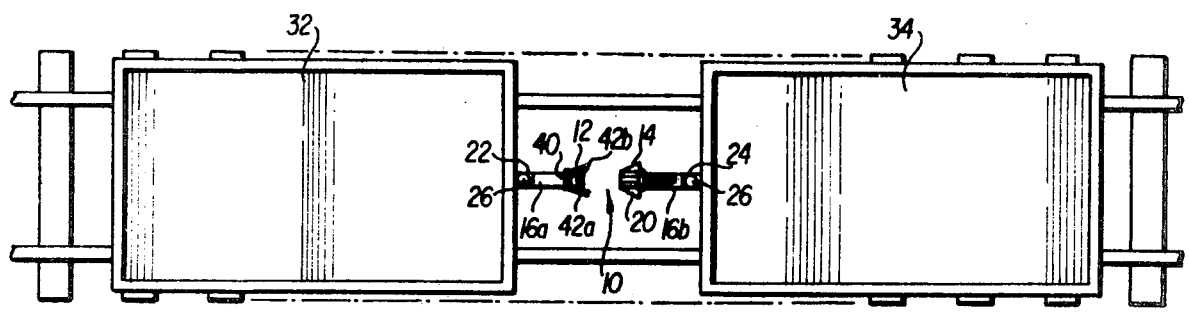
FIG. 1 is a top view of two mining cars having complementary male and female coupling members of an automatic car coupler of this invention.
Figure 2:
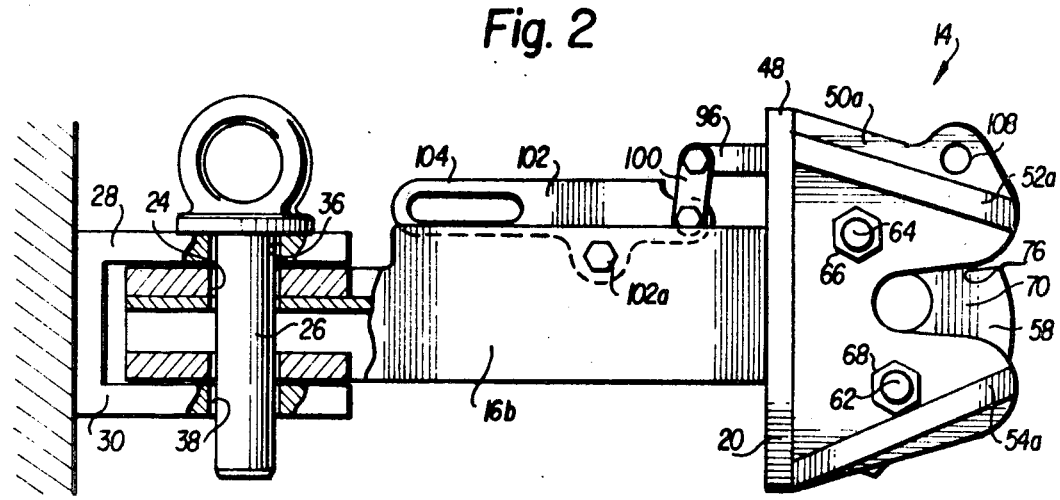
FIG. 2 is a side partially-sectional, view of the male coupling member of FIG. 1, including a small portion of the mining car on which it is mounted.
Figure 7:
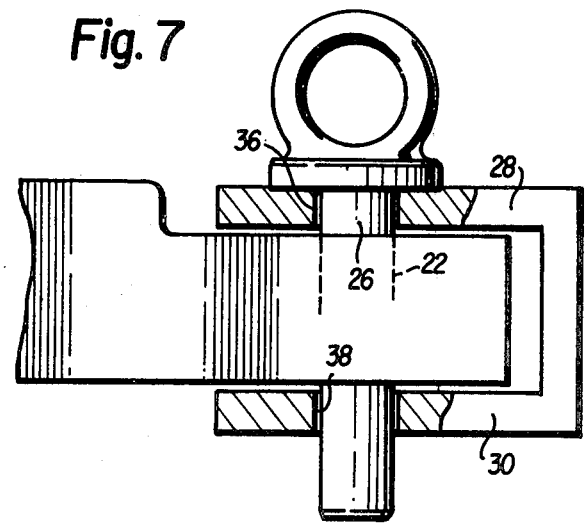
FIG. 7 is a closeup, partially-sectional, side view of a drop-pin mounting arrangement for mounting the male and female coupling members of FIG. 1 to mining cars.

Referring now to the drawings, a coupler 10 of this invention includes first (female) and second (male) coupling members 12 and 14. The female coupling member includes a mounting bar 16a having a female coupling-member frame 18 attached at an outer end thereof and the male coupling member 14 includes a mounting bar 16b having a male coupling member frame 20 mounted at the end thereof. At the opposite ends of the mounting bars 16a and 16b are holes 22 and 24 respectively which are mounted by means of drop pins 26 to parallel car-frame elements 28 and 30 (FIGS. 2 and 7) respectively. In this respect, the female coupling member 12 is attached to a coal-mining car 32 and the male coupling member 14 is attached to the coal-mining car 34 by respectively inserting mounting pins 26 in holes 36 and 38 of the parallel-car elements 28 and 30 and also through the holes 22 and 24 of the mounting bars 16a and 16b. Thus, the mounting bars 16a and 16b are free to pivot horizontally about the drop pins 26.

Figure 5:
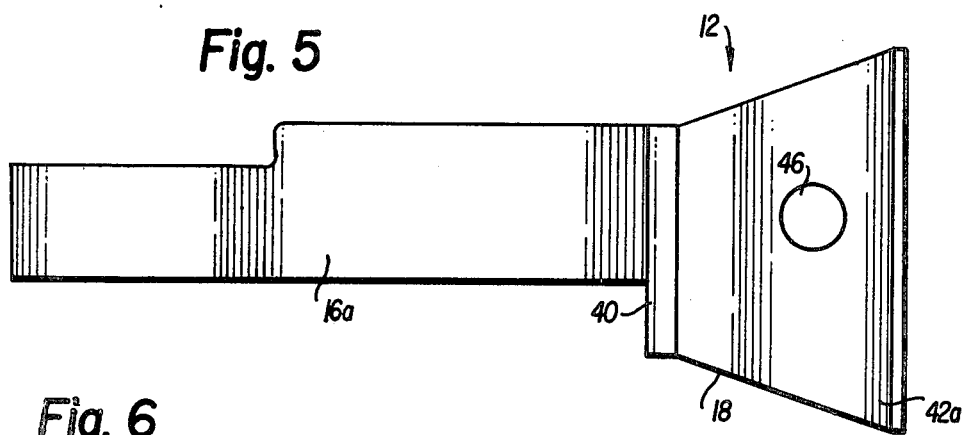
FIG. 5 is a side view of the female coupling member of FIG. 1.
Figure 6:
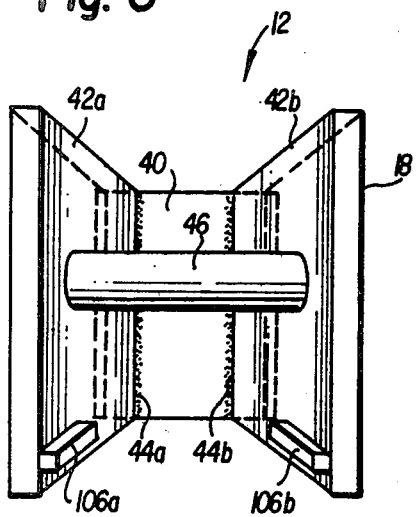
FIG. 6 is an end view of the female coupling member of FIG. 5.

The female coupling-member frame 18 (FIGS. 1–4) includes a rear frame member 40 (FIGS. 5 and 6) having diverging frame members 42a and b welded to ends thereof at 44a and b and diverging outwardly therefrom. A coupling bar 46 is welded, or otherwise attached, between the diverging frame members 42a and b such that 360° of access is provided about the coupling bar 46.

The frame of the male coupling member 14 (FIGS. 2, 3, 4, and 8) includes a rear plate 48 which is attached to the mounting bar 16b and vertical parallel plates 50a and b attached to the rear plate 48. Also forming a part of the frame of the male coupling member 14 are wedge-shaped upper guide supports 52a and b and lower guide supports 54a and b. The vertical parallel plates 50a and b define a gap 56 (FIG. 3) therebetween in which a latching lever 58 and a locking lever 60 are pivotally mounted by means of bolts 62 and 64 and nuts 66 and 68. The vertical parallel plates 50a and b each defines a slot 70 which is aligned with the other's slot 70 and it should be noted from FIGS. 2 and 4 that the pivot mount bolts 62 and 64 are positioned on opposite sides of the slots 70. The latching lever 58 includes a first arm 72 having a nose portion 74 which actually serves as a latch. The nose portion 74 defines a notch 76 at the outer extremity thereof.

Figure 4:
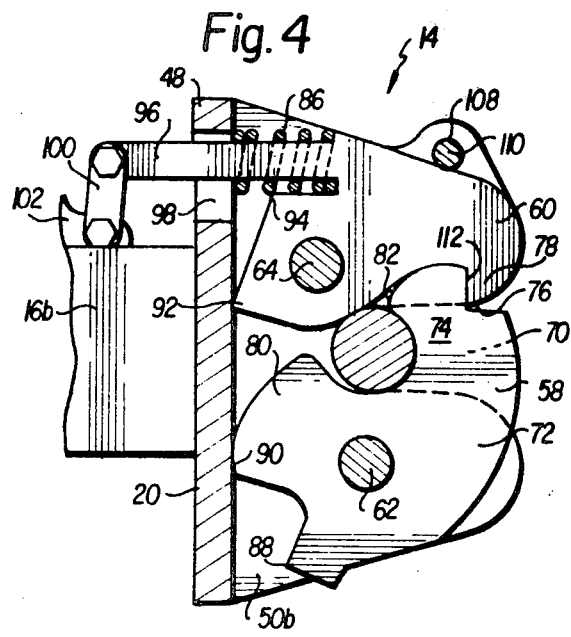
FIG. 4 is a sectional view taken on line 4—4 in FIG. 3 showing the male coupling member when it is coupled with the coupling bar of the female coupling member.
Figure 3:
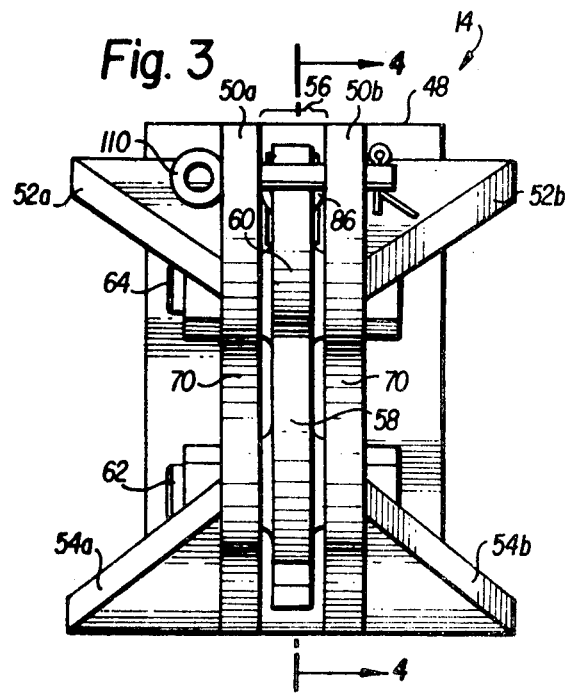
FIG. 3 is an end view of the male coupling member of FIG. 2.

The locking lever 60 forms a complementary hook portion 78 which is pivotal about the bolt 64 to move into the notch 76 of the latching lever 58 when the latching lever is in a latching position as is depicted in FIG. 4.

Figure 8:
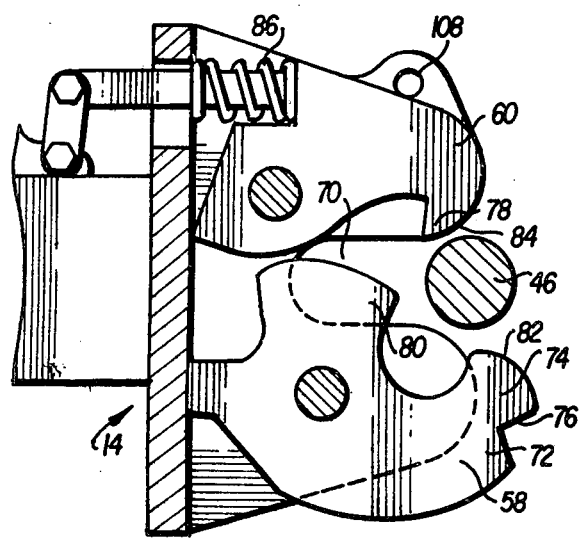
FIG. 8 is a view similar to FIG. 4 but showing the male coupling member prior to coupling with the coupling bar 46 of the female coupling member.

The latching lever 58 further includes a second arm 80 which is on the opposite side of the bolt 62. The second arm 80 is sized and positioned about the bolt 62 such that when the latching lever 58 is rotated in an uncoupled, clockwise, direction, as depicted in FIG. 8, it is between the slots 70 of the adjacent parallel plates 50a and b. Thus, when the coupling bar 46 moves into the slots 70 it impinges on the second arm 80 of the latching lever 58 and thereby automatically rotates the latching lever 58 in a counterclockwise direction to bring the first arm 72 of the latching lever 58 behind the coupling bar 46 to a position at which the notch 76 can be engaged by the locking lever 60. In this respect, it should be noted that an outer, nose surface 82 of the latching lever 58 and a complementary surface 84 of the locking lever 60 form cam surfaces which, when the latching lever 58 is rotated in a counterclockwise direction, cams the locking lever outwardly to allow the latching lever 58 to move to a latching position as shown in FIG. 4. In this respect, the locking lever 60 is biased in a clockwise direction as depicted in FIGS. 4 and 8 by a compression spring 86 which is mounted between the rear plate 48 and the locking lever 60. Thus, the locking lever 60 is biased to a locking position.

Surface points 88, 90, 92 and 94 of the latching and locking levers 58 and 60 form stop surfaces which impinge on the rear plate 48 to form the ranges of rotations of these two levers.

The locking lever 60 has integral therewith an uncoupling arm 96 which extends backwardly almost parallel with the mounting bar 16b through an opening 98 in the rear plate 48. The uncoupling arm 96 is pivotally attached to a link 100 which is, in turn, pivotally attached to a release lever 102. The release lever 102 is pivotally attached to the mounting bar 16b at a pivot point 102a. When a handle 104 of the release lever 102 is pulled outwardly, away from the mounting bar 16b, the locking lever 60 is thereby pulled, against the bias of spring 86, to an unlocking position to disengage the notch 76 of the latching lever 58.

It should be noted that the diverging frame members 42a and b of the female coupling member 12 form counterparts of the edge surfaces of the wedged-shaped upper and lower guide supports 52a and b and 54a and b of the male coupling member 14 such that when the female and male coupling members 12 and 14 come together, these frame members contact one another to guide the coupling bar 46 into the slots 70. Further, the diverging frame members 42a and b of the female coupling member 12 include keys 106a and b thereon which engage the lower surfaces of the lower guide supports 54a and b of the male coupling member 14 to vertically guide the coupling bar 46 into the slot 70.

The vertical parallel plates 50a and b include complementary holes 108 therein through which a safety locking pin 110 can be inserted to impinge on a rear surface of the locking lever 60 and thereby prevent the locking lever 60 from rotating out of the locking position shown in FIG. 4.

It should be noted that the interface 112 between the latching lever 58 and the locking lever 60 is approximately perpendicular to the direction of travel of the coupling bar 46. Further, this interface is approximately in line with the axis of the locking lever 60. If this interface surface formed an obtuse angle with the direction of pull of the coupling member 46 when the female and male coupling members 12 and 14 are being pulled apart then it would be a camming surface which would tend to open the locking lever 60, which would be undesirable. On the other hand, if it formed an acute angle therewith, it would be difficult to rotate the locking lever 60 to an unlocking position, again which would be undesirable. Thus, this perpendicular angle is desirable.

In operation of this device, the mounting bars 16a and b are respectively mounted to coal-mining cars 32 and 34 by inserting mounting pins 26 through holes in the parallel car frame elements 28 and 30 and the mounting bars 16a and b. It is noted that the coupling elements of this invention can be mounted on existing cars which use simple bar couplers as is described in the Background of the Invention if the mounting bars 16a and b are properly sized to fit existing gaps between parallel car-frame elements.

Thereafter, when it is desired to interlock the female and male coupling members, they are approximately rotated about their respective mounting pins 26 until they are approximately aligned. The cars are then urged together and the diverging frame members 42a and b of the female coupling member 12 and the upper and lower guide supports 52a and b and 54a and b of the male coupling member 14, as well as the keys 106a and b thereof, guide the coupling bar 46 of the female coupling member into the slots 70 of the male coupling member. Before the coupling bar 46 enters the slots 70, the latching lever 58 is resting in a clockwise position as shown in FIG. 8 such that its first arm 72 is below both of the slots 70. Thus, the coupling bar 46 enters the slots 70 without contacting the first arm 72. However, the second arm 80 of the latching lever 58 is beside the slots 70 and is thereby engaged by the coupling bar 46 to rotate the latching lever 58 in a counterclockwise direction and thereby pivot the nose portion 74 behind the coupling bar 46 to the other side of the coupling bar 46. During this procedure the camming surfaces 82 and 84 of the latching lever 58 and the locking lever 60 rotate the locking lever 60 in a counterclockwise direction until the hook portion 78 of the locking lever is forced into the notch 76 of the latching lever by the compression spring 86. At this point the first and second coupling members 12 and 14 are coupled, or interlocked, with one another. For safety, the safety locking pin 110 is inserted through the complementary holes 108 in the parallel plates 50a and b to prevent the locking lever 60 from rotating out of this locking position.

When one desires to decouple the female and male coupling members 12 and 14 he removes the safety locking pin 110 and pulls on the handle 104 to rotate the locking lever 60 from its locking position through the link 100. When the mining cars 32 and 34 are pulled apart the coupling bar 46 can easily rotate the latching lever 58 about its bolt 62 to decouple the cars.

It will be understood by those skilled in the art that the coupler of this invention is not only uncomplicated but it is reliable and has little longitudinal slack therein. On the other hand, it allows cars a great deal of horizontal pivoting freedom with one another for going around corners and vertical pivoting movement for changes in grade. In this respect, the complementary diverging frame members 42a and b on the female member and the upper and lower guide supports 52a and b and 54a and b on the male member maintain rigidity as to horizontal pivoting, but allow verticle pivoting.

In addition, the coupler can be easily, and safely opened for decoupling when desired. Also, strain on the male coupler 14 is divided between the latching and locking levers 58 and 60 so as to reduce the possibility of a failure of either of these elements.

While the invention has been particularly shown and described with reference to a preferred embodiment, it will be understood by those skilled in the art that various changes in form and detail may be made therein without departing from the spirit and scope of the invention. For example, in the preferred embodiment, the locking lever release is attached to the mounting bar 16b. However, it could be attached to a car or another type of release mechanism could be used. Also, the mounting of the male and female coupling members 12 and 14 to the cars 32 and 34 could be accomplished in various ways other than by using the drop pins 26. The size of the coupling members can be increased or decreased to suit load ratings.

The embodiments of the invention in which an exclusive property or privilege are claimed are defined as follows:

1. In a car coupler for coupling first and second adjacent cars together of a type comprising first and second coupling members respectively mounted on said first and second adjacent cars for interlocking with each other, the improvement wherein:

said first coupling member comprises an elongated coupling bar which is supported to have 360° of access thereabout;

said second coupling member comprises a frame member having a latching lever and a locking lever pivotally mounted thereon at latching-lever and locking-lever pivot mounts, said latching-lever pivot mount having an axis which is approximately parallel to, but laterally spaced to one side of, said bar when said first and second coupling members are interlocked with each other, said latching lever forming a latching hook having a nose portion for passing behind said bar into a blocking position for blocking separation of said bar from said second coupling member when said latching lever is pivoted to an interlocking position, a portion of said nose portion passing behind said bar defining an engagement surface, said locking lever defining a locking hook for moving into an engaging position from the other side of said bar for engaging said engagement surface to thereby lock said latching lever behind said bar in response to said latching lever moving to said interlocking position.

2. In a car coupler as in claim 1 wherein said locking lever pivot mount also has an axis which is approximately parallel to said bar when said first and second coupling members are interlocked with each other, said bar being positioned intermediate said latching lever and locking lever pivot mounts when said first and second coupling members are interlocked.

3. In a car coupler as in claim 1 or 2 wherein said latching lever includes a closing arm means for contacting said elongated coupling bar when said elongated coupling bar is moved toward an interlocking position to thereby rotate said latching lever nose portion behind said coupling bar and into engagement with said locking lever.

4. In a car coupler as in claim 1 wherein said first coupling member includes complementary, spaced, diverging frame members for engaging said second coupling member to guide said latching lever between said complementary, spaced, diverging frame members, said elongated bar of said first coupling member being rigidly mounted between opposing surfaces of said complementary, spaced, diverging frame members.

5. In a car coupler as in claim 1 or claim 4 wherein is further included a locking pin and wherein said second-coupling member frame member includes at least one hole therein for receiving said locking pin and holding said locking pin in a blocking position for blocking rotation of said locking lever from said locking position.

6. In a car coupler as in claim 5 wherein is further included a locking-lever actuator mounted on said second coupling member for rotating said locking lever out of said locking position upon activation thereof.

7. In a car coupler as in claim 3 wherein is further included a locking pin and wherein said second-coupling member frame member includes at least one hole therein for receiving said locking pin and holding said locking pin in a blocking position for blocking rotation of said locking lever from said locking position.

8. In a car coupler as in claim 1 wherein said engagement surface, when said locking lever is in a locking position, is perpendicular to the direction of travel of said coupling bar when said coupling bar is moved from an interlocking position and wherein said locking hook has a complementary surface which engages said engagement surface when said coupling members are interlocked and which is parallel thereto, and wherein said engagement and complementary surfaces, when said latching and locking levers are in an interlocking position, are close to a line passing through the axis of said locking lever and parallel to said direction of travel of said copuling bar.

9. In a car coupler for coupling first and second adjacent cars together of a type comprising first and second coupling members respectively mounted on said first and second adjacent cars for interlocking with each other, the improvement wherein:

said first and second coupling members each comprises a mounting bar which is mounted respectively to aid cars by means of vertical pins passing through holes in car frame elements and holes in first ends of said mounting bars;

said first coupling member further comprising at the mounting bar's other end, an elongated coupling bar which is supported to have 360° of access thereabout;

said second coupling member comprising at the mounting bar's other end a frame member having a latching lever and a locking lever pivotally mounted thereon at latching-lever and locking-lever pivot mounts, said latching-lever pivot mount having an axis which is approximately parallel to, but laterally spaced from, said coupling bar when said first and second coupling members are interlocked with each other, said latching lever forming a latching hook having a nose portion for passing behind said coupling bar when said latching lever is pivoted to an interlocking position, said nose portion defining an engagement surface, on the opposite side of said bar for locking said latching lever behind said bar in response to said latching lever moving to said interlocking position.

10. In a car coupler as in claim 9 wherein said locking lever pivot mount also has an axis which is approximately parallel to, said coupling bar when said first and secnd coupling members are interlocked with each other, said coupling bar being positioned intermediate said latching lever and locking lever pivot mounts when said first and second coupling members are interlocked.

11. In a car coupler as in claim 9 or claim 10 wherein said latching lever includes a closing arm means for contacting said elongated coupling bar when said elongated coupling bar is moved toward an interlocking position to thereby rotate said latching lever nose portion behind said coupling bar and into engagement with said locking lever.

12. In a car coupler as in claim 9 wherein said first coupling member includes complementary, spaced, diverging frame members for engaging said second coupling member to guide said latching lever between said complementary spaced, diverging frame members, said elongated bar of said first coupling member being rigidly mounted between opposing surfaces of said complementary, spaced, diverging frame members.

13. In a car coupler as in claim 9 or claim 12 wherein is further included a locking pin and wherein said second-coupling member frame member includes at least one hole therein for receiving said locking pin, said locking pin bing in a blocking position for blocking rotation of said locking lever from said locking position.

14. In a car coupler as in claim 13 wherein is further included a locking-lever actuator mounted on said second coupling member for rotating said locking lever out of said locking position upon activation thereof.

15. In a car coupler as in claim 11 wherein is further included a locking pin and wherein said second-coupling member frame member includes at least one hole therein for receiving said locking pin, said locking pin being in a blocking position for blocking rotation of said locking lever from said locking position.

16. In a car coupler as in claim 9 wherein said engagement surface, when said locking lever is in a locking position, is perpendicular to the direction of travel of said coupling bar when said coupling bar is moved from an interlocking position and wherein said locking hook has a complementary surface which engages said engagement surface when said coupling members are interlocked and which is parallel thereto, and wherein said engagement and complementary surfaces, when said latching and locking levers are in an interlocking position, are close to a line passing through the axis of said locking lever and parallel to said direction of travel of said coupling bar.

17. In a car coupler for coupling first and second adjacent cars together of a type comprising first and second coupling members respectively mounted on said first and second adjacent cars for interlocking with each other, the improvement wherein:

said first coupling member comprises an elongated coupling bar which is supported to have access thereabout;

said second coupling member comprises a frame member having a latching member movably mounted thereon at a latching-member mount, said latching member being movable at said mount for passing behind said bar when said latching member is moved to an interlocking position, for preventing sepration between said coupling members;

said first coupling member including complementary, spaced, diverging frame members for engaging said second coupling member to guide said latching member between said complementary, spaced, diverging frame members, said elongated bar of said first coupling member being rigidly mounted between opposing surfaces of said complementary, spaced, diverging frame members.

18. In a car coupler as in claim 17 wherein said elongated coupling bar is supported to have 360° of access thereabout.

* * * * *